US010088145B2

(12) United States Patent
Holzinger et al.

(10) Patent No.: US 10,088,145 B2
(45) Date of Patent: Oct. 2, 2018

(54) ILLUMINATION DEVICE FOR A COOKING ZONE ELEMENT OF A COOKING HOB COVERED BY A TRANSPARENT PANEL AND A CORRESPONDING COOKING ZONE ELEMENT AND COOKING HOB

(71) Applicant: Electrolux Home Products Corporation N. V., Brussels (BE)

(72) Inventors: Jochen Holzinger, Rothenburg o.d. Tauber (DE); Claus Meider, Rothenburg o.d. Tauber (DE); Harald Hoffmann, Rothenburg o.d. Tauber (DE)

(73) Assignee: Electrolux Home Products Corporation N.V., Brussels (BE)

( * ) Notice: Subject to any disclaimer, the term of this patent is extended or adjusted under 35 U.S.C. 154(b) by 717 days.

(21) Appl. No.: 14/375,903

(22) PCT Filed: Mar. 12, 2013

(86) PCT No.: PCT/EP2013/054923
§ 371 (c)(1),
(2) Date: Jul. 31, 2014

(87) PCT Pub. No.: WO2013/149792
PCT Pub. Date: Oct. 10, 2013

(65) Prior Publication Data
US 2015/0013660 A1    Jan. 15, 2015

(30) Foreign Application Priority Data

Apr. 2, 2012   (DE) .................... 20 2012 003 287 U
Jul. 5, 2012   (EP) ..................................... 12175031

(51) Int. Cl.
*F21V 33/00*    (2006.01)
*H05B 3/68*    (2006.01)
(Continued)

(52) U.S. Cl.
CPC .......... *F21V 33/0044* (2013.01); *F24C 7/083* (2013.01); *F24C 15/102* (2013.01);
(Continued)

(58) Field of Classification Search
CPC ..... F21V 33/0044; F24C 7/083; F24C 15/102
(Continued)

(56) References Cited

U.S. PATENT DOCUMENTS 2,870,316 A  *  1/1959  Ferguson, Jr. .......... F24C 7/082
                                                          219/445.1
6,969,834 B2  *  11/2005  Kaji .................. G02B 6/001
                                                          219/506

(Continued)

FOREIGN PATENT DOCUMENTS

EP    1596635    11/2005
EP    2161966    3/2010
(Continued)

OTHER PUBLICATIONS

International Search Report for PCT/EP2013/054923, dated May 29, 2013, 3 pages.

*Primary Examiner* — Avinash Savani
*Assistant Examiner* — Aaron Heyamoto
(74) *Attorney, Agent, or Firm* — Pearne & Gordon LLP

(57) ABSTRACT

An illumination device for a cooking zone element is provided for a cooking hob which is covered by a transparent panel. The illumination device is provided for a cooking zone element with a central cutout in a central portion of said cooking zone element. The illumination device includes at least one diffuser screen arranged or arrangeable in an upper portion of the central cutout of the cooking zone element and parallel to the transparent panel of the cooking hob. The illumination device includes at least one light source element arranged or arrangeable below the central cutout of the (Continued)

Figure 1:
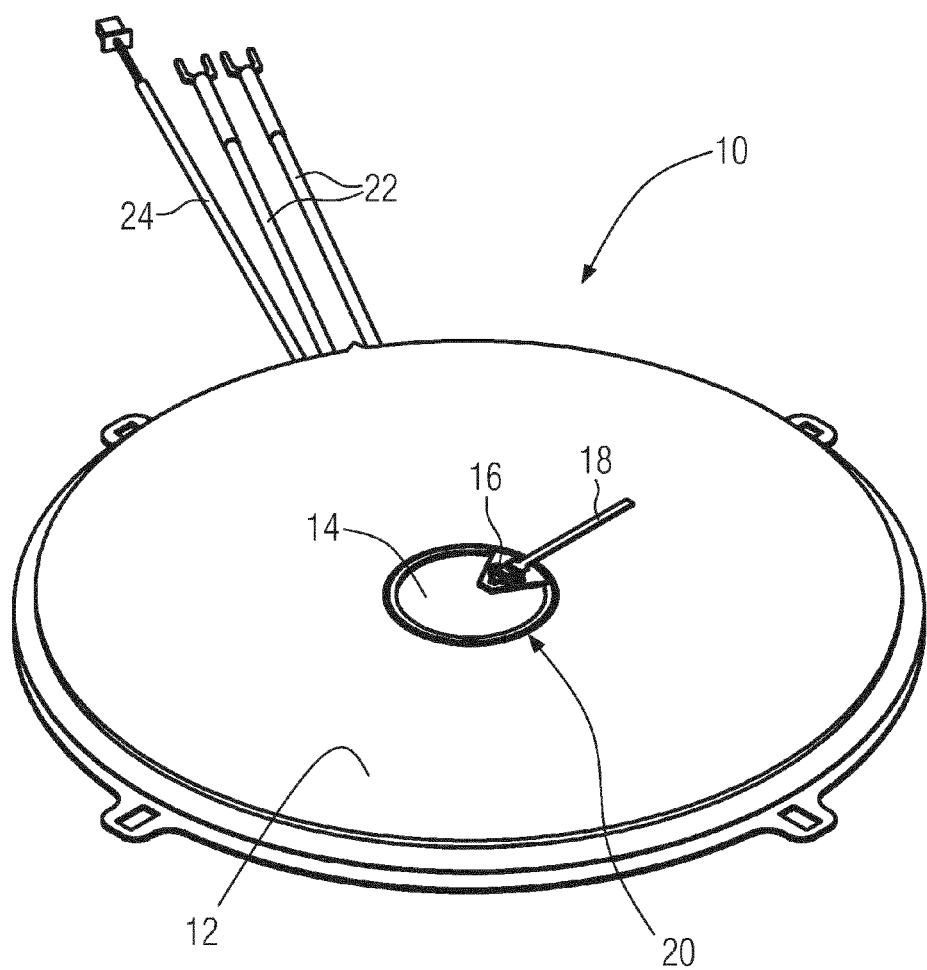

cooking zone element. The illumination device includes an optical lens enclosing an upper portion of the light source element. Further, the present invention relates to a corresponding cooking zone element and cooking hob.

14 Claims, 5 Drawing Sheets

(51) Int. Cl.
- *G09F 23/00* (2006.01)
- *H05B 6/12* (2006.01)
- *F24C 7/08* (2006.01)
- *F24C 15/10* (2006.01)
- *G02B 5/02* (2006.01)
- *H05B 3/74* (2006.01)
- *F21W 131/30* (2006.01)

(52) U.S. Cl.
CPC ........... *G02B 5/02* (2013.01); *G09F 23/0058* (2013.01); *H05B 3/68* (2013.01); *H05B 3/742* (2013.01); *H05B 6/1209* (2013.01); *F21W 2131/30* (2013.01)

(58) Field of Classification Search
USPC ........................................................ 126/213
See application file for complete search history.

(56) References Cited

U.S. PATENT DOCUMENTS

| | | | | |
|---|---|---|---|---|
| 2002/0075763 | A1* | 6/2002 | Miyanishi | G11B 5/127 369/13.13 |
| 2003/0006230 | A1* | 1/2003 | Kaji | G02B 6/001 219/620 |
| 2003/0006231 | A1* | 1/2003 | Nagata | H05B 6/1209 219/622 |
| 2003/0164370 | A1* | 9/2003 | Aihara | H05B 6/1218 219/622 |
| 2006/0091135 | A1* | 5/2006 | Kondo | H05B 6/1218 219/621 |
| 2007/0084457 | A1* | 4/2007 | Wiedemann | H01R 13/2471 126/39 H |
| 2008/0264931 | A1* | 10/2008 | Vilato | C03C 17/00 219/622 |
| 2009/0122563 | A1* | 5/2009 | Ko | A47J 37/00 362/418 |
| 2009/0314771 | A1* | 12/2009 | Okada | H05B 6/062 219/647 |
| 2010/0243641 | A1* | 9/2010 | Ogasawara | H05B 6/062 219/622 |
| 2013/0107536 | A1* | 5/2013 | Hiraoka | F21S 8/04 362/277 |
| 2013/0270251 | A1* | 10/2013 | Furuti | F24C 7/083 219/445.1 |

FOREIGN PATENT DOCUMENTS

| | | | |
|---|---|---|---|
| EP | 2458285 A1 | * 5/2012 | ............. F24C 7/082 |
| GB | 1346574 A | * 2/1974 | ............. F24C 7/082 |
| JP | 03114183 A | * 5/1991 | ........... H05B 6/1218 |
| JP | 2007299707 | 11/2007 | |
| WO | 2012003991 | 1/2012 | |

* cited by examiner

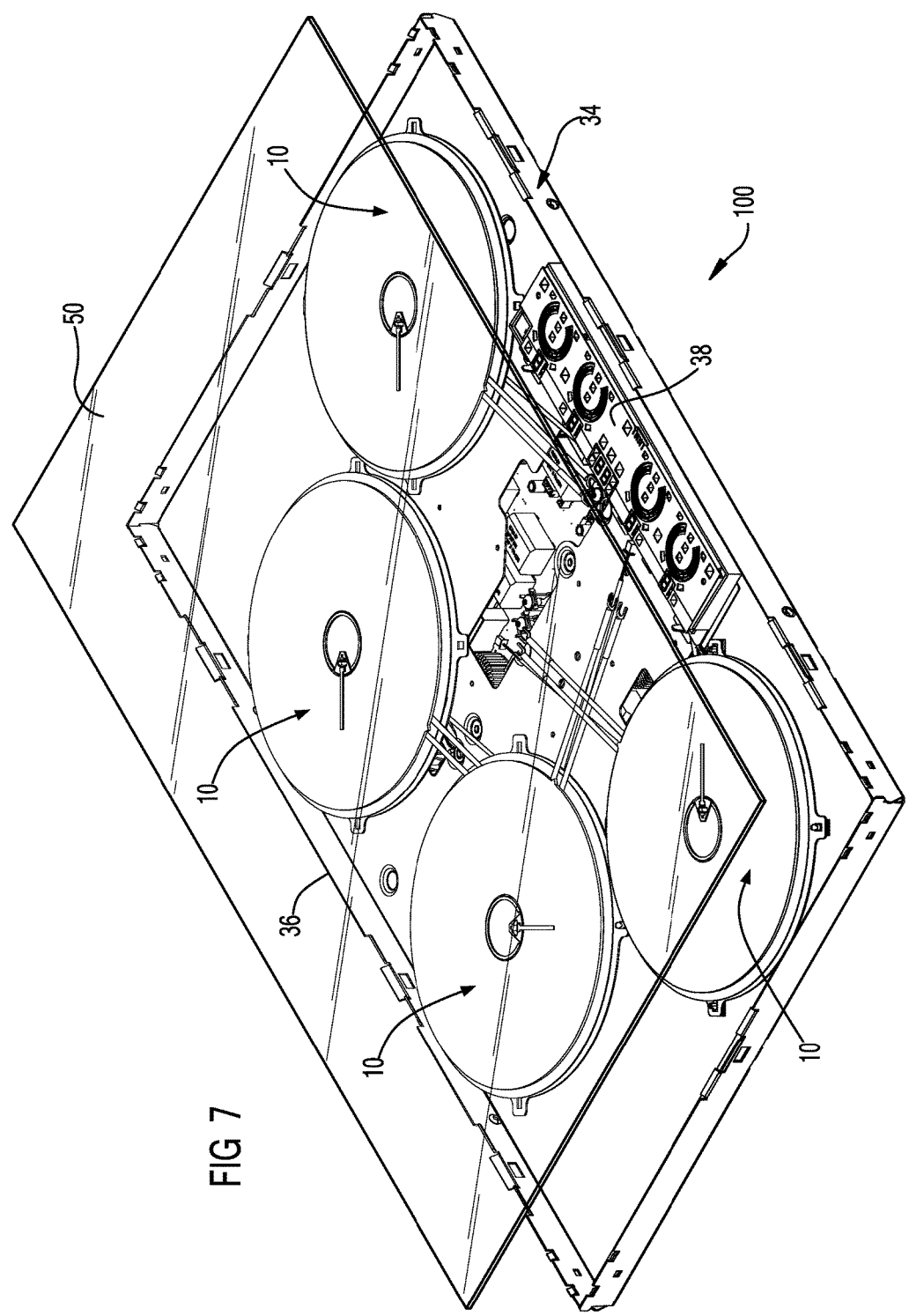

ILLUMINATION DEVICE FOR A COOKING ZONE ELEMENT OF A COOKING HOB COVERED BY A TRANSPARENT PANEL AND A CORRESPONDING COOKING ZONE ELEMENT AND COOKING HOB

The present invention relates to an illumination device for a cooking zone element provided for a cooking hob covered by a transparent panel according to the preamble of claim 1. Further, the present invention relates to a cooking zone element for a cooking hob covered by a transparent panel according to the preamble of claim 9. Additionally, the present invention relates to a cooking hob with a transparent panel according to the preamble of claim 13.

The cooking zones on a cooking hob are indicated. Usually, said cooking zones are indicated by printed symbols. Sometimes, the cooking zone includes an illumination device for indicating said cooking zone. Thus, each cooking zone may be indicated by a corresponding illumination device.

WO 2012/003991 A1 discloses an induction cooking hob with illumination equipment. An intermediate layer is arranged between a panel and a chassis of the induction cooking hob. One or more light emitting diodes are arranged in the centre of the induction coil. The intermediate layer comprises a plurality of cutouts arranged according to a predetermined pattern within the heating zone. The light emitting diode corresponds with at least one cutout.

However, the operating temperature range of the light emitting diodes is much lower than the temperature in the surrounding of the induction coils.

It is an object of the present invention to provide an illumination device for a cooking zone element, which allows an improved cooling of the light source element.

The object of the present invention is achieved by the illumination device according to claim 1.

The illumination device according to the present invention is provided for a cooking zone element of a cooking hob covered by a transparent panel, wherein:
- the illumination device is provided for a cooking zone element with a central cutout in a central portion of said cooking zone element,
- the illumination device includes at least one diffuser screen arranged or arrangeable in an upper portion of the central cutout of the cooking zone element and parallel to the transparent panel of the cooking hob,
- the illumination device includes at least one light source element arranged or arrangeable below the central cutout of the cooking zone element, and
- the illumination device includes an optical lens enclosing an upper portion of the light source element.

The main idea of the present invention is that a part of the illumination device is arranged or arrangeable inside the central cutout of the cooking zone element, while another part of the illumination device is arranged or arrangeable below said central cutout. In particular, the arrangement of the light source element below the central cutout of the cooking zone element allows a sufficient cooling of said light source element. The area of the central cutout may be relative small in order to avoid the negative effect on the heat transfer to the centre of a pot arranged above. The height of the illumination device is marginally bigger than the height of the cooking zone element or heating element.

Preferably, the illumination device includes at least one conical light guide formed as a conical tube and arranged or arrangeable inside the central cutout of the cooking zone element.

Further, the diffuser screen may cover a top side of the conical light guide. The conical light guide and the diffuser screen allow a large illumination area in relation to the base area of the central cutout.

According to a preferred embodiment of the present invention the illumination device includes at least one printed circuit board arranged or arrangeable below the central cutout of the cooking zone element, wherein the light source element is arranged on said printed circuit board.

For example, the printed circuit board is an insulated metal substrate (IMS) aluminium printed circuit board.

Alternatively, the diffuser screen is made of heat resistant ceramic material.

Further, the diffuser screen may be made of a semi-transparent material.

For example, the diffuser screen is made of a sand blasted glass ceramic material.

Moreover, a light shaping layer may be arranged above the diffuser screen.

Alternatively, the light shaping layer may be printed on the diffuser screen.

Further, the present invention relates to a cooking zone element for a cooking hob covered by a transparent panel, wherein the cooking zone element comprises:
- a heating element formed as a circular disk,
- a central cutout in a central portion of said cooking zone element and heating element, and
- an illumination device.

According to the present invention the illumination device is arranged inside and below the central cutout.

Thus, a part of the illumination device is arranged or arrangeable inside the central cutout of the cooking zone element, while another part of the illumination device is arranged or arrangeable below said central cutout. The arrangement of the light source element below the central cutout of the cooking zone element allows a sufficient cooling of said light source element.

Preferably, the cooking zone element includes the illumination device mentioned above.

For example, the heating element is an induction coil.

Alternatively, the heating element is a thick film heating element.

Additionally, the present invention relates to a cooking hob with a transparent panel, in particular a glass ceramic panel and at least one cooking zone element, wherein the cooking hob comprises at least one cooking zone element mentioned above and/or at least one illumination device as described above.

According to another example, the light shaping layer is a coloured coating on the bottom side of the transparent panel or glass ceramic panel.

Alternatively, the light shaping layer is a non-transparent heat resistant foil with cutouts on the bottom side of the transparent panel or glass ceramic panel.

At last, the cooking hob may include at least one cooling fan for generating an air stream in order to cool the light source element of the illumination device.

Novel and inventive features of the present invention are set forth in the appended claims.

Figure 2:
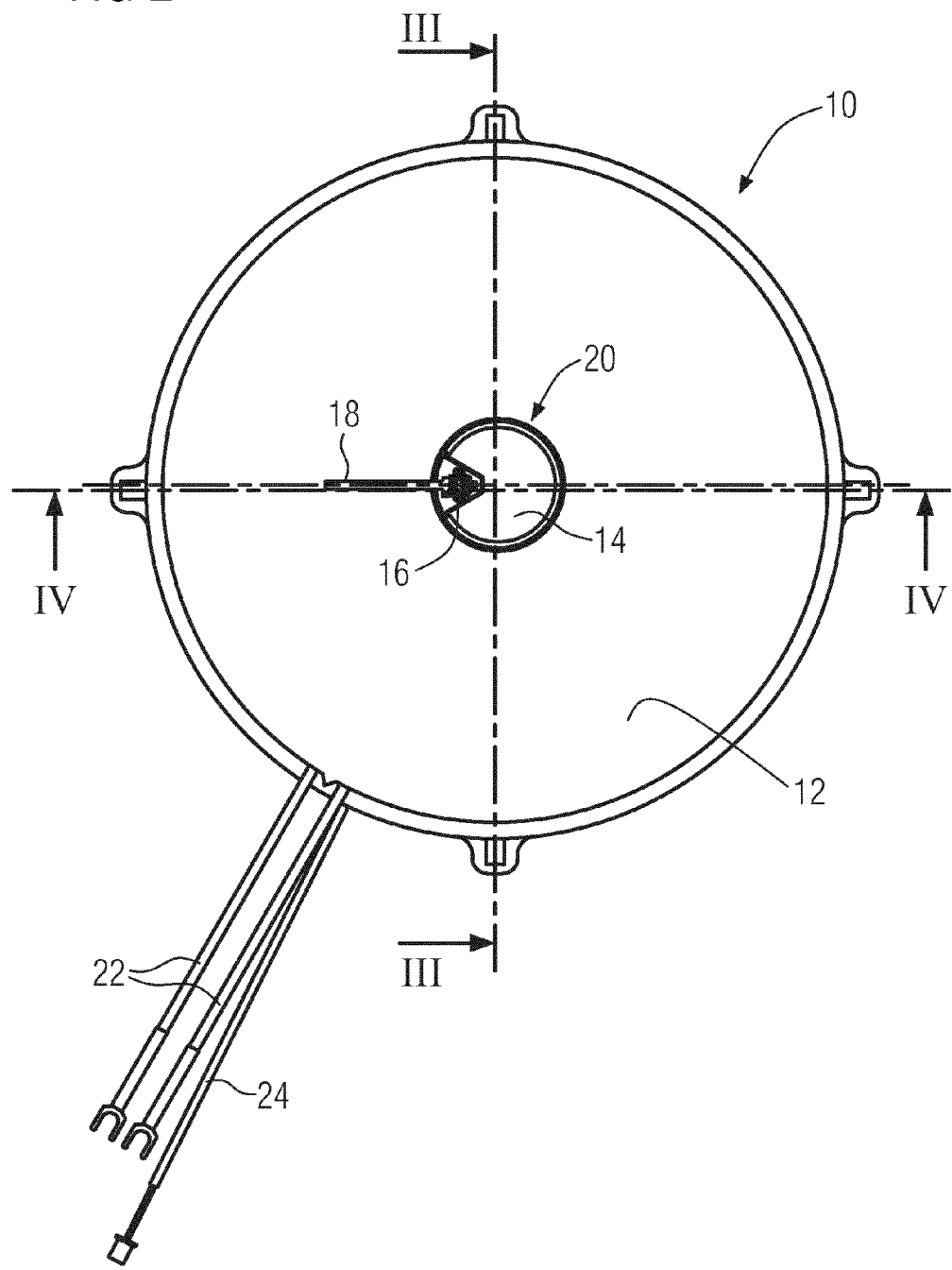
Figure 3:
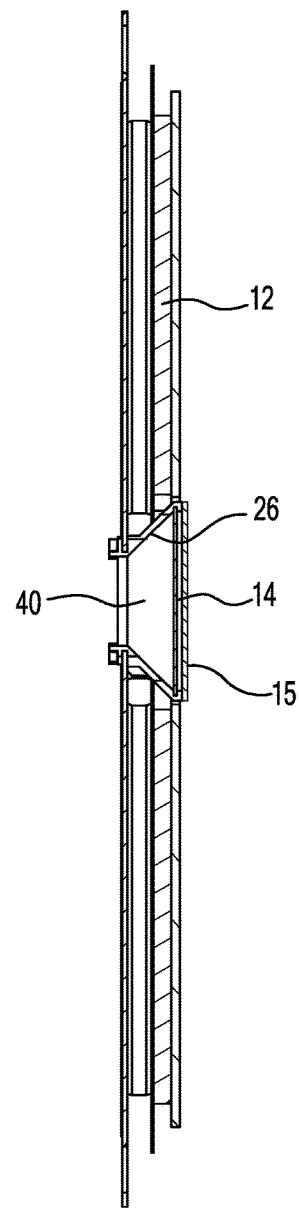
Figure 4:
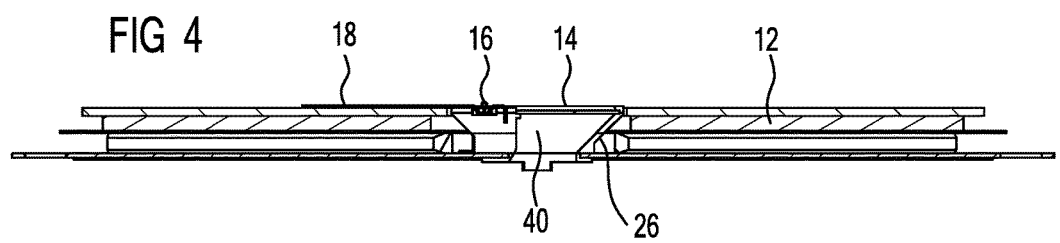
Figure 5:
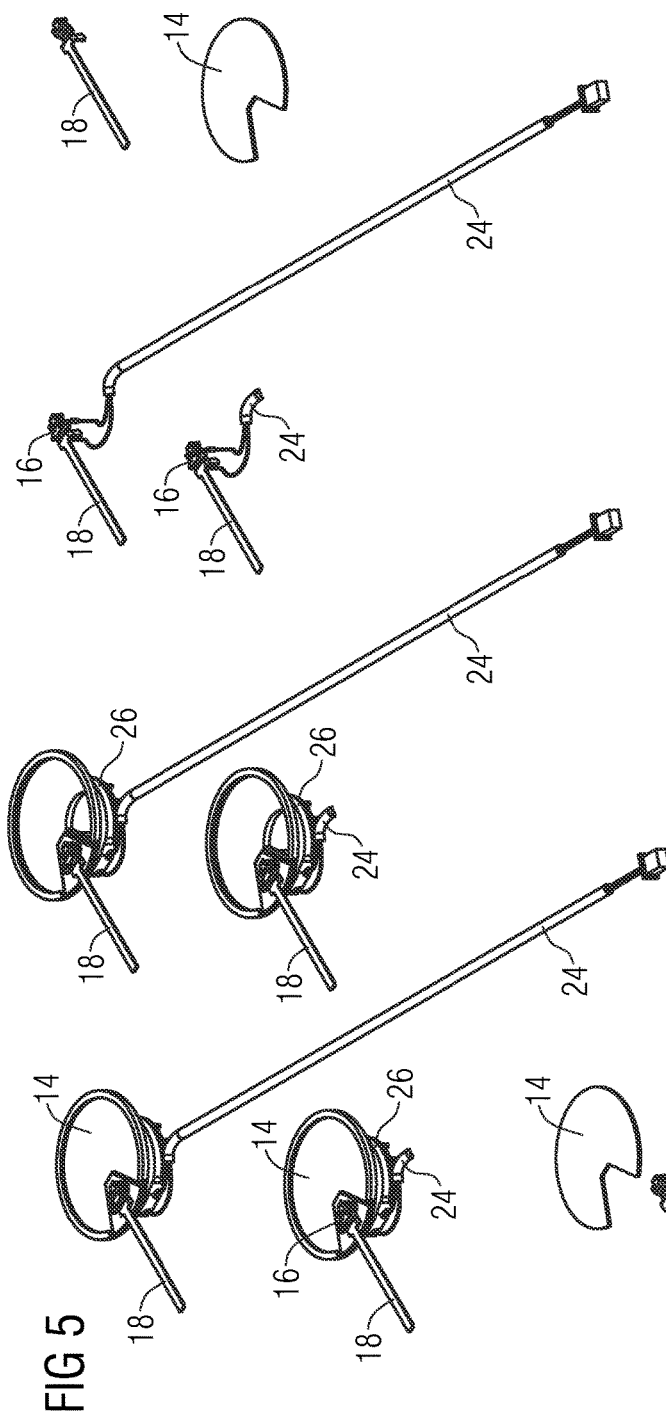
Figure 6:
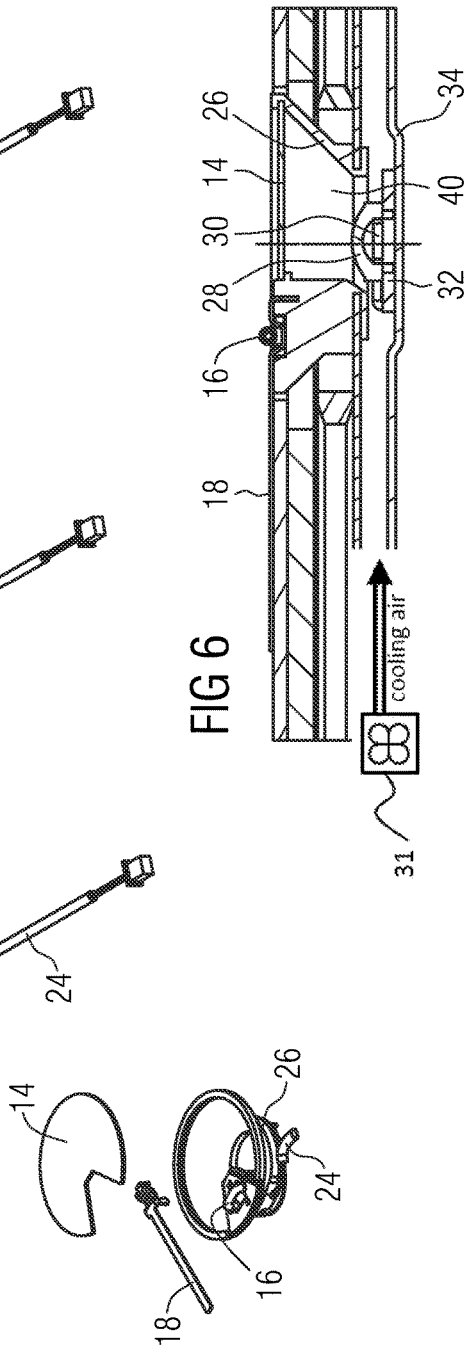

The present invention will be described in further detail with reference to the drawings, in which FIG. 1 illustrates a perspective view of a cooking zone element with an illumination device according to a preferred embodiment of the present invention, FIG. 2 illustrates a schematic top view of the cooking zone element with the illumination device according to the preferred embodiment of the present invention, FIG. 3 illustrates a sectional side view of the cooking zone element with the illumination device along the line III-III in FIG. 2 according to the preferred embodiment of the present invention, FIG. 4 illustrates a sectional side view of the cooking zone element with the illumination device along the line IV-IV in FIG. 2 according to the preferred embodiment of the present invention, FIG. 5 illustrates a set of exploded views of the illumination device and its components according to the preferred embodiment of the present invention, FIG. 6 illustrates a detailed sectional side view of the illumination device arranged in the cooking zone element. A cooling fan for cooling a light source element of the illumination device according to a preferred embodiment is shown schematically, and FIG. 7 illustrates a perspective view of a chassis of a cooking hob including four cooking zone elements according to the preferred embodiment of the present invention.

FIG. 1 illustrates a perspective view of a cooking zone element 10 with an illumination device 20 according to a preferred embodiment of the present invention. The cooking zone element 10 is provided for a cooking hob covered by a panel, in particular by a glass ceramic panel.

The cooking zone element 10 is substantially formed as a circular disk with a central cutout 40. The cooking zone element 10 includes a heating element 12. The heating element 12 may be an induction coil, a thick film heating element or another heating element. The heating element 12 is formed as a circular disk and includes also the central cutout 40. When the cooking zone element 10 is arranged in the cooking hob, then said cooking zone element 10 and the heating element 12 extend in a horizontal plane. A top side and a bottom side of the central cutout are open. The illumination device 20 is arranged inside the central cutout 40. The illumination device 20 comprises a diffuser screen 14. The diffuser screen 14 forms the top side of the illumination device 20. The diffuser screen 14 closes completely or nearly the top side of the central cutout 40. The diffuser screen 14 is substantially a circular disk.

The diffuser screen 14 includes a cut formed as a sector of a circle. A temperature sensor 16 is arranged within the cut of the diffuser screen 14. An elongated heat conducting element 18 extends from the temperature sensor 16 horizontally on the top side of the heating element 12. The length of the heat conducting element 18 is about the half radius of the cooking zone element 10 and/or the heating element 12.

Further, the cooking zone element 10 includes two power cables 22 and a sensor cable 24. The power cables 22 are provided for supplying the heating element 12. The sensor cable 24 is provided for connecting the temperature sensor 16 to a control unit of the cooking hob. The sensor cable 24 may include one or two wires. Preferably, the sensor cable 24 includes two wires.

FIG. 2 illustrates a schematic top view of the cooking zone element 10 with the illumination device 20 according to the preferred embodiment of the present invention. The heating element 12 and the central cutout 40 have a circular base area in each case. The circular diffuser screen 14 includes the cut, in which the temperature sensor 16 is arranged. The length of the heat conducting element 18 corresponds with the half radius of the cooking zone element 10 and/or the heating element 12.

FIG. 3 illustrates a sectional side view of the cooking zone element 10 with the illumination device 20 along the line III-III in FIG. 2 according to the preferred embodiment of the present invention.

The shape of the central cutout 40 is shown in FIG. 3. The central cutout 40 is substantially formed as a truncated cone arranged upside-down. Thus, the bigger circular surface of the truncated cone forms the top side of the central cutout 40. In a similar way, the smaller circular surface of the truncated cone forms the bottom side of the central cutout 40.

The illumination device 20 is substantially arranged inside the central cutout 40. A smaller lower part of the illumination device 20 is arranged below the central cutout 40. The illumination device 20 includes a conical light guide 26. The conical light guide 26 is formed as a conical tube with an upper open end and a lower open end. The upper open end of the conical light guide 26 is bigger than the lower open end. The shape of the conical light guide 26 corresponds with the shape of the central cutout 40. The upper open end of the conical light guide 26 is covered by the diffuser screen 14.

FIG. 4 illustrates a sectional side view of the cooking zone element 10 with the illumination device 20 along the line IV-IV in FIG. 2 according to the preferred embodiment of the present invention. FIG. 4 clarifies that the temperature sensor 16 and the heat conducting element 18 are arranged on the top side of the cooking zone element 10. The temperature sensor 16 and the heat conducting element 18 are substantially arranged at the same level as the diffuser screen 14. Further, the shape of the conical light guide 26 corresponds with the shape of the central cutout 40.

FIG. 5 illustrates a set of exploded views of the illumination device 20 and its components according to the preferred embodiment of the present invention.

The circular diffuser screen 14 includes the cut formed as the sector of a circle. The heat conducting element 18 is elongated and comprises a U-shaped end portion for receiving the temperature sensor 16. The temperature sensor 16 is connected to the sensor cable 24. In this example, the sensor cable 24 includes two wires.

The conical light guide 26 is formed as the conical tube with the upper open end and the lower open end. The upper open end of the conical light guide 26 is covered by the diffuser screen 14. The heat conducting element 18 is fixable at the conical light guide 26, wherein the temperature sensor 16 is received by the U-shaped end portion of said heat conducting element 18.

FIG. 6 illustrates a detailed sectional side view of the illumination device 20 arranged in the cooking zone element 10 according to the preferred embodiment of the present invention. The conical light guide 26 with the diffuser screen 14, the heat conducting element 18 and the temperature sensor 16 are arranged inside the central cutout 40 of the cooking zone element 10.

Further, the illumination device 20 includes a light source element 30, an optical lens 28 and a printed circuit board 32. In this example, the light source element 30 is a light emitting diode (LED). Alternatively, the light source element 30 may be an ensemble of light emitting diodes. The light source element 30 is installed on the printed circuit board 32. The optical lens 28 encloses the upper portion of the light source element 30. The light source element 30, the optical lens 28 and the printed circuit board 32 are arranged below the central cutout 40 of the cooking zone element 10.

The arrangement of the light source element 30, the optical lens 28 and the printed circuit board 32 below the central cutout 40 of the cooking zone element 10 allows a relative low temperature around the light source element 30. This increases the lifetime of the light source element 30 and the predetermined light distribution.

The conical light guide 26 allows a large illumination area in relation to the area of the central cutout 40. Thus, the area of the central cutout 40 may be relative small in order to avoid the negative effect on the heat transfer to the centre of a pot. The height of the illumination device 20 is marginally bigger than the height of the cooking zone element 10 or heating element 12.

The illumination area above the central cutout 40 is relative large, so that different illuminated shapes can be realized. For example, said illuminated shapes may be a cross, a symbol or a brand name.

FIG. 7 illustrates a perspective view of a chassis 34 of a cooking hob including four cooking zone elements 10 according to the preferred embodiment of the present invention.

The chassis 34 includes a casing 36 with a bottom wall and four side walls. The four cooking zone elements 10 are arranged on the bottom wall of the casing 36. Further, a user interface 38 is arranged on the bottom wall of the casing 36. The four cooking zone elements 10 and the user interface 38 are inside the casing 36. In other words, the chassis 34 is the cooking hob without the glass panel.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 cooking zone element
12 heating element
14 diffuser screen
15 light shaping layer
16 temperature sensor
18 heat conducting element
20 illumination device
22 power cable
24 sensor cable
26 conical light guide
28 optical lens
30 light source element, light emitting diode (LED)
31 cooling fan
32 printed circuit board
34 chassis
36 casing
38 user interface
40 central cutout
50 transparent panel
100 cooking hob

The invention claimed is:

1. An illumination device for a cooking zone element that includes a heating element, the cooking zone element being provided for a cooking hob, the cooking hob being covered by a transparent panel, wherein:
the cooking zone element extends in a horizontal plane and is formed as a circular disk with a central cutout in a central portion of said cooking zone element,
the illumination device includes at least one diffuser screen arranged or arrangeable in an upper portion of the central cutout of the cooking zone element and parallel to the transparent panel,
the illumination device includes at least one light source element arranged or arrangeable entirely below the central cutout of the cooking zone element, and
the illumination device includes an optical lens enclosing an upper portion of the light source element.

2. The illumination device according to claim 1, wherein the illumination device includes at least one conical light guide formed as a conical tube and arranged or arrangeable inside the central cutout of the cooking zone element.

3. The illumination device according to claim 2, wherein the diffuser screen covers a top side of the conical light guide.

4. The illumination device according to claim 1, wherein the illumination device includes at least one printed circuit board arranged or arrangeable below the central cutout of the cooking zone element, wherein the light source element is arranged on said printed circuit board.

5. The illumination device according to claim 4, wherein the printed circuit board is an insulated metal substrate (IMS) aluminum printed circuit board.

6. The illumination device according to claim 1, wherein the diffuser screen is made of any one of a semi-transparent material, a heat resistant ceramic material and a sand blasted glass ceramic material, or any combination thereof.

7. The illumination device according to claim 1, wherein a light shaping layer is arranged above the diffuser screen.

8. The illumination device according to claim 1, wherein a light shaping layer is printed on the diffuser screen.

9. A cooking zone element for a cooking hob covered by a transparent panel, wherein the cooking zone element comprises:
the illumination device according to claim 1 arranged below the central cutout,
the heating element being formed as the circular disk, and
the central cutout being located in the central portion of said cooking zone element and the heating element.

10. The cooking zone element according to claim 9, wherein the heating element is an induction coil.

11. The cooking zone element according to claim 9, wherein the heating element is a thick film heating element.

12. A cooking hob with a glass ceramic panel, and at least one cooking zone element, wherein the cooking hob comprises at least one cooking zone element according to claim 9.

13. The cooking hob according to claim 12, wherein a light shaping layer is printed on the diffuser screen, said light shaping layer being a colored coating on a bottom side of the glass ceramic panel, or said light shaping layer being a non-transparent heat resistant foil with cutouts on the bottom side of the glass ceramic panel.

14. The cooking hob according to claim 12,
wherein the cooking hob includes at least one cooling fan for generating an air stream in order to cool the light source element of the illumination device.

* * * * *